United States Patent
Rao

(10) Patent No.: US 11,250,488 B1
(45) Date of Patent: Feb. 15, 2022

(54) METHOD AND SYSTEM FOR DETERMINING NEW CATEGORIES WITH WHICH A TARGET USER HAS NOT INTERACTED

(71) Applicant: A9.com, Inc., Palo Alto, CA (US)

(72) Inventor: Nikhil S. Rao, San Jose, CA (US)

(73) Assignee: A9.COM, INC., Palo Alto, CA (US)

( * ) Notice: Subject to any disclaimer, the term of this patent is extended or adjusted under 35 U.S.C. 154(b) by 399 days.

(21) Appl. No.: 16/036,442

(22) Filed: Jul. 16, 2018

(51) Int. Cl.
  *G06Q 30/00* (2012.01)
  *G06Q 30/06* (2012.01)
  *G06N 3/08* (2006.01)
  *G06F 16/35* (2019.01)
  *G06F 16/904* (2019.01)
  *G06F 16/901* (2019.01)

(52) U.S. Cl.
  CPC ....... *G06Q 30/0631* (2013.01); *G06F 16/358* (2019.01); *G06F 16/904* (2019.01); *G06F 16/9024* (2019.01); *G06N 3/08* (2013.01)

(58) Field of Classification Search
  CPC ..... G06Q 30/0631; G06N 20/00; G06N 7/046
  See application file for complete search history.

(56) References Cited

U.S. PATENT DOCUMENTS

| 8,533,134 B1* | 9/2013 | Zhao | G06N 20/00 706/12 |
| 10,861,077 B1* | 12/2020 | Liu | G06Q 30/0601 |
| 2012/0109966 A1* | 5/2012 | Liang | G06F 16/338 707/740 |
| 2013/0198030 A1* | 8/2013 | Linden | G06Q 30/0277 705/26.7 |
| 2019/0355041 A1* | 11/2019 | Sewak | G06Q 30/0643 |

OTHER PUBLICATIONS

Tuan, Trinh Xuan; Phuong, Tu Minh. 3D convolutional networks for session-based recommendation with content features. Aug. 27, 2017. Association for Computing Machinery, Inc. (Year: 2017).*

* cited by examiner

*Primary Examiner* — Brittney N Miller
(74) *Attorney, Agent, or Firm* — Hogan Lovells US LLP

(57) ABSTRACT

Various embodiments attempt to predict items in a new product category that may be of interest to a particular user when the user has not interacted with or made purchases in that product category. In accordance with various embodiments of the present disclosure, this is accomplished by training machine learning models, such as deep neural networks, using both the historical purchase data from the particular user as well as the historical purchase data from many other users to infer what new category of items the particular user might be interested in. In some embodiments, the previous purchase data of the other users are used to construct a graph, and the graph is used to train the machine learning model rather than the raw data. The graph can represent the entirety of the previous purchase data with less actual data, thereby requiring less memory and other computational resources.

16 Claims, 10 Drawing Sheets

METHOD AND SYSTEM FOR DETERMINING NEW CATEGORIES WITH WHICH A TARGET USER HAS NOT INTERACTED

BACKGROUND

Online shopping, whether for physical items or media content, has become increasingly popular both for the convenience it provides as well as the large selection of items available. Customers are even able to purchase products from a wide variety of categories from a single e-commerce platform. For example, an e-commerce platform may offer clothing, toys, housewares, books, and even digital content such as movies or music, which may be instantly streamed or downloaded upon purchase. However, despite the availability of such a wide array of product categories, a customer may typically purchase products from a limited number of categories. For example, a customer may have only purchased books and toys on the e-commerce platform, and may not be aware that other product categories, such as groceries, are also available. It is also a challenge for the e-commerce platform to recommend products to a customer from categories that a customer has not made any purchases in, as there is no data available for that customer in those product categories.

BRIEF DESCRIPTION OF THE DRAWINGS

Various embodiments in accordance with the present disclosure will be described with reference to the drawings, in which.

DETAILED DESCRIPTION

Figure 1:
FIG. 1 illustrates a computing device providing access an electronic marketplace.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for e-commerce technology. In particular, various embodiments attempt to predict items in a new product category that may be of interest to a particular user when the user has not interacted with or made purchases in that product category. In accordance with various embodiments of the present disclosure, this is accomplished by training machine learning models, such as deep neural networks, using both the historical purchase data from the particular user as well as the historical purchase data from many other users to infer what new category of items the particular user might be interested in. Essentially, the machine learning model looks for other users with similar purchasing behavior as the particular user and determines what other categories those other users have purchased in that the particular user has not purchased in, as this may be a robust way to predict new categories that the particular user is likely to be interested in. Such techniques allows for both generalization across users as well as personalization of the recommended new category or items that are presented to individual users. In some embodiments, the previous purchase data of the other users are used to construct a graph, and the graph is used to train the machine learning model rather than the raw data. The graph can represent the entirety of the previous purchase data with less actual data, thereby requiring less memory and other computational resources.

More specifically, in various embodiments, the presently disclosed techniques for recommending new categories to a user includes classifying a catalog of items offered on an online platform into a plurality of categories and obtaining historical purchase data of a plurality of users of the online platform. The historical purchase data includes items from the catalog purchased by each user of the plurality of users and the respective categories of the items. In some embodiments, a graph is constructed from the historical purchase data, in which the graph comprises a plurality of nodes and a plurality of edges. The plurality of nodes represent the plurality of categories and an edge connecting two nodes represents at least one instance in which a user of the plurality of users purchased items from both categories represented by the two nodes, or a "co-purchase". In some embodiments, the edges may have respective weights corresponding to the number of instances of the respect co-purchase. Thus, the graph can represent the complete information of the historical purchase data with less data. A model comprising a deep neural network may then be trained using the graph to determine a new category from the plurality of categories that a user is predicted to be interested in but has not previously purchased from based on one or more previous categories that the user has purchased from.

After training, the model may be used to make recommendation for a target user. Specifically, in order to obtain a new category recommendation for a target user, one or more previous categories that the target user has purchased items from can be determined and used as input into the model. The one or more previous categories may be processed through the trained model, and the model then produces an output including at least one new category that the target user is predicted to be interested in but has not previously made purchases from. In some embodiments, one or more items belonging to the new category may be recommended to the target user. Various other features and application can be implemented based on, and thus practice, the above described technology and presently disclosed techniques. Various other applications, processes, and uses are presented below with respect to the various embodiments, each of which improves the operation and performance of the computing device(s) on which they are implemented.

FIG. 1 illustrates an example 100 computing device 102 providing access to an electronic marketplace 104, in accordance with various embodiments. In this example, a computing device 102 provides access to an electronic marketplace 104, in accordance with various embodiments. Although a tablet computing device is shown in this example, it should be understood that various other types of electronic devices that are capable of determining and processing input and providing output can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the elements illustrated can be part of a single device, while at least some elements illustrated and otherwise utilized for such a device can be provided as one or more peripheral devices or accessories within the scope of the various embodiments.

The electronic marketplace 104 may offer products from a wide variety of categories 106. For example, an electronic marketplace 104 may offer physical products such as clothing, toys, housewares, books, as well as even digital content such as movies, music, software, or e-books, which may be streamed or downloaded. The different product categories may be organized into a plurality of browse nodes 106, but which a user can browse the offerings. The browse nodes themselves may be organized into a hierarchy. For example, first level browser nodes may include the broad categories of clothing, food, toys, and books. However, each of these categories may include additional browse nodes. For example, the clothing category may include the categories women's clothing, men's clothing, and children's clothing. In some cases, there are large number of product categories. User can also search for items more specifically using a search bar 108 provided in the interface.

However, despite the availability of such a wide array of product categories, a customer may typically purchase products from a limited number of categories. For example, a customer may only purchase books and toys on the e-commerce platform, and may not even be aware that other product categories, such as groceries, are also available. It is also a challenge for the e-commerce platform to recommend products to a customer from categories that a customer has not made any purchases in, as there is no data available for that customer in those product categories. This challenge may be referred to as the "cold start" problem, or what category of products should be recommended to a customer who has not made any purchases in that category before. This is challenging problem to solve because there is no user data for the new category. For example, given that a user has not watched a movie, what movie might the user want to watch? One way of bypassing this problem is to recommend new categories or products based on overall popularity of certain products or product categories on the electronic marketplace. Another method is to have fixed slots for recommending predetermined products or categories to all user regardless of each user's specific behavior. Embodiments of the present disclosure allows for the new category recommendations to be personalized for each user thereby increasing user experience and increasing the likelihood that the customer will engage with the recommended items. The present disclosure provides for a way to predict which new products or product categories a user may be interested in by using data from other category purchases to infer this.

Figure 2:
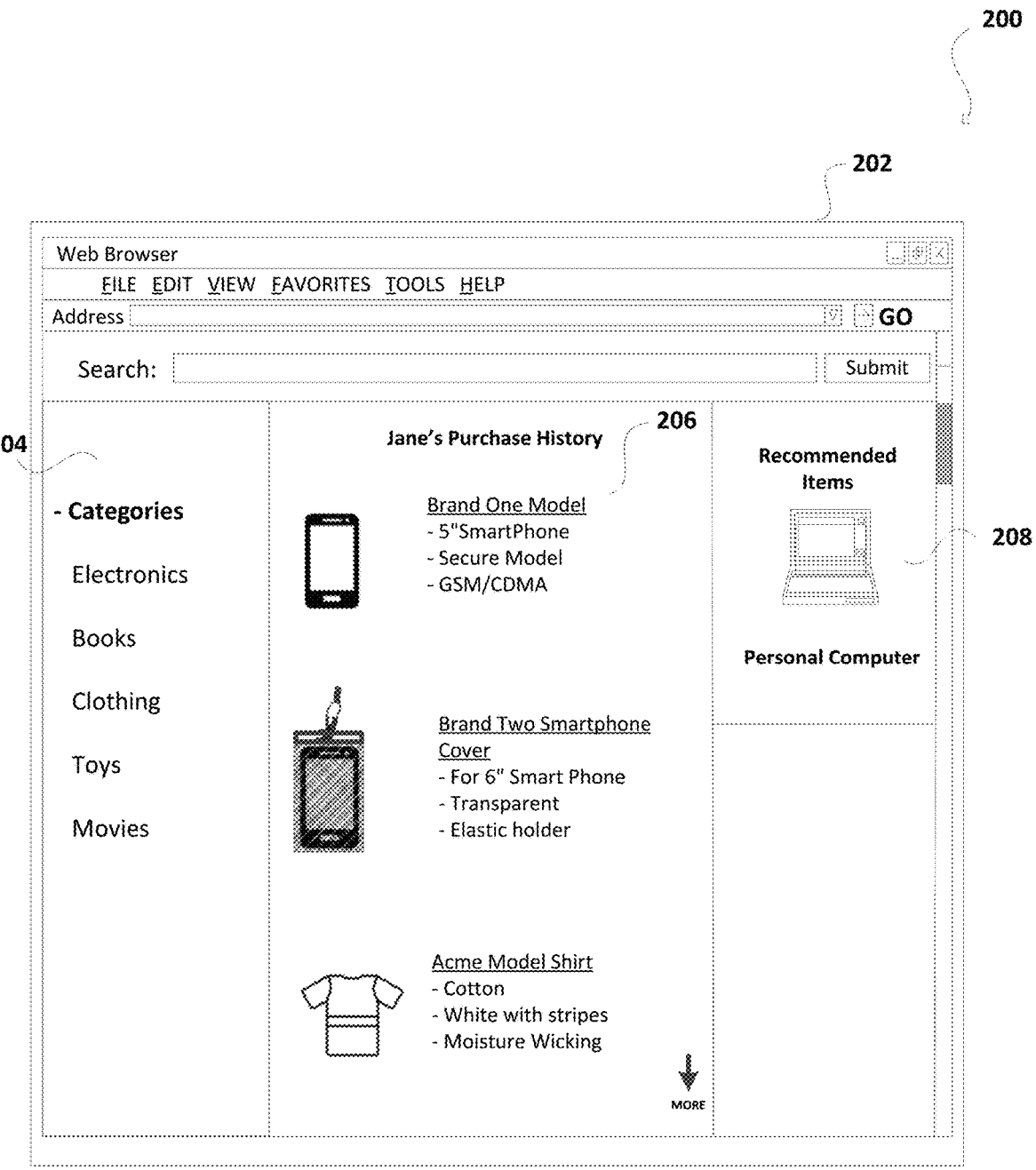
FIG. 2 illustrates an example interface of an electronic marketplace in which the presently disclosure is utilized, in accordance with various embodiments, in accordance with various embodiments of the present disclosure.

FIG. 2 an example 200 computing device providing access to an electronic marketplace 202 in which the present disclosure is utilized, in accordance with various embodiments. In this example, the electronic marketplace 202 may have a plurality of browse nodes 204 or user-facing classification of products available on the electronic marketplace 202. The electronic marketplace 202 may further include a purchase history 206 for the user, as well as recommended products 208 for the user.

Various embodiments attempt to recommend items 208 in a new product category that may be of interest to a particular user when the user has not interacted with or made purchases in that product category. In accordance with various embodiments of the present disclosure, this is accomplished by training machine learning models, such as deep neural networks, using both the previous purchase data from the particular user 206 as well as the previous purchase data 302 (FIG. 3) from many other users to infer what new category of items the particular user might be interested in.

Specifically, in order to obtain a new category recommendation 208 for a target user, one or more previous categories that the target user has purchased items from can be determined and used as input into the model. The one or more previous categories may be processed through the trained model, and the model then produces an output including at least one new category that the target user is predicted to be interested in but has not previously made purchases from. In some embodiments, one or more items belonging to the new category may be recommended to the target user. In some embodiments, the new category determined by the neural network for the target user represents the next category that the target user is predicted to make a purchase from that the target user has not made a purchase in before.

In some embodiments, the one or more previous categories includes a predetermined number of the most recent categories with which the target user has interacted or all the categories that the target user interacted with over the course of a predetermined amount of time. Thus, the most recent data is being used, which may produce more relevant results. For example, while the categories from which a user makes purchases in may be diverse, they may follow a similar theme: books for training dogs, and exercise apparel. This suggests that the user has a pet, and are keen on exercising with the pet. In this case, we can recommend wearables or toys for pets.

Figure 3:
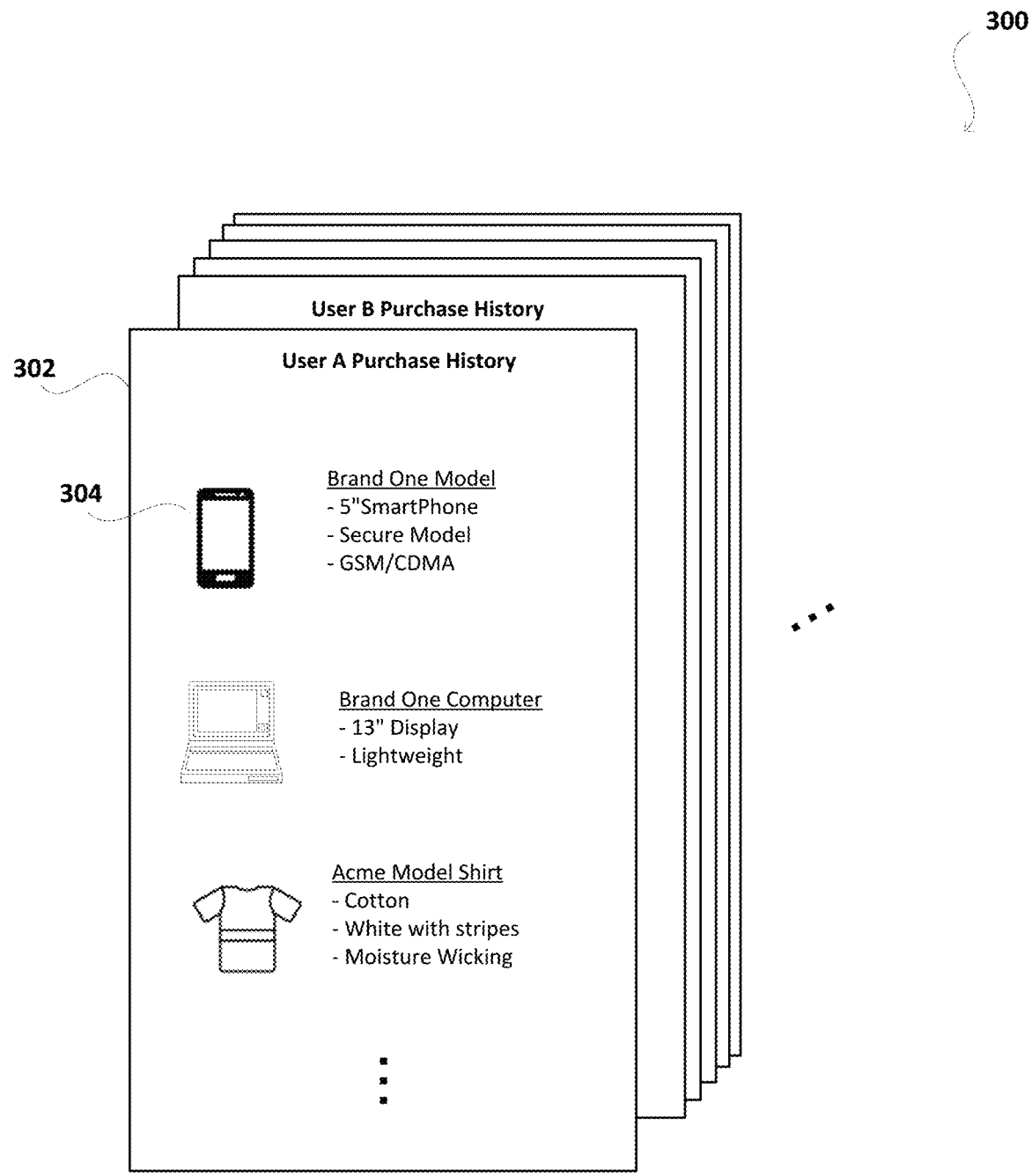
FIG. 3 illustrates a representation of historical purchase data of the electronic marketplace, in accordance with various embodiments of the present disclosure.

FIG. 3 illustrates a representation 300 of historical purchase data 302 of the electronic marketplace, in accordance with various embodiments. As mentioned, In accordance with various embodiments of the present disclosure, this is accomplished by training machine learning models, such as deep neural networks, using both the previous purchase data from the particular user as well as the previous purchase data from many other users to infer what new category of items the particular user might be interested in. Obtain historical purchase data of a plurality of users of the online platform, the historical purchase data including items from the catalog 304 purchased by each user and/or the respective categories of the items. In some embodiments, the respective categories that the purchased items belong to are determined on the fly based on how to categories are defined. For example, the categories of the purchased products may not necessarily have the category label as a part of their metadata, but rather the purchased products may be mapped to the respective categories to which they are classified. In some cases, once the categories of the previously purchases are known, only the categories may be included in the historical purchase data rather than the specific product itself, since the information of interest is which categories did the others users purchase rather than the specific products.

In some embodiments, the historical purchase data 302 may also include the order or timeframe during which a product or category was purchased by the respective user. This may provide information into an organic order in which users discover or become interested in different categories. This may help in determining the next category that the target user is predicted to make a purchase from that the target user has not made a purchase in before, rather than just any new category the user may be interested in. The historical purchase data may be obtained from a portion of past users of the electronic platform, or a sample set of users.

In some embodiments, sample interaction data, rather than specific purchase data, of a plurality of past or current users of the platform is obtained. The sample interaction data for each user of the plurality of past or current users includes a set of categories from the plurality of categories with which the user has interacted. Interaction with a category may vary depending on the embodiment or type of electronic platform. For example, interaction may refer to purchasing a product and/or viewing or clicking on the product. Other forms of interaction may also be applicable, such as placing an item in the electronic shopping cart, liking or highly rating an item, social sharing of an item, amount of time spend browsing the item or item page, among many others. In some embodiments, the sample interaction data for each user may be associated with a predetermined time period or a predetermined number of most recent categories with which each user has interacted.

Figure 4:
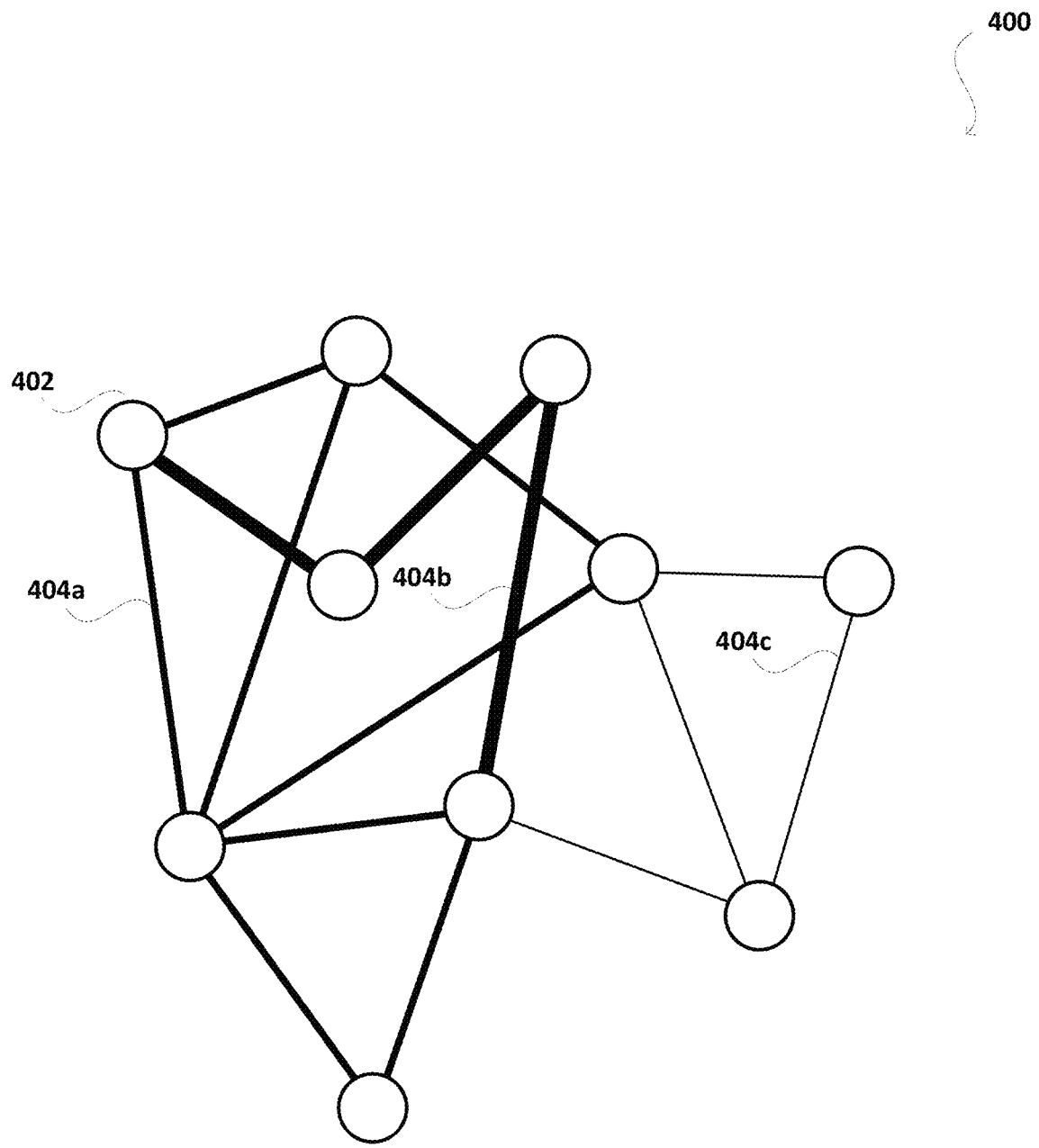
FIG. 4 illustrates an example graph representation of the historical purchase data, in accordance with various embodiments of the present disclosure.

FIG. 4 illustrates an example graph representation 400 of the historical purchase data, in accordance with various embodiments. In some embodiments, a graph is constructed from the historical purchase data, in which the graph comprises a plurality of nodes 402 and a plurality of edges 404. The plurality of nodes represent the plurality of categories. An edge is construct in the graph if two categories are co-purchased by the same customer. Thus, an edge connecting two nodes represents at least one instance in which a user of the plurality of users purchased items from both categories represented by the two nodes, or a "co-purchase". In some embodiments, the edges may have respective weights corresponding to the number of instances of the respect co-purchase. As illustrated by line thickness of the edges 404 in FIG. 4, edge 404*b* has a greater weight than edge 404*a*, which has a greater weight than edge 404*c*. Thus, the graph can represent the complete information of the historical purchase data with less data. The edge weight may be a monotonically increasing function of the number of times the categories are co-purchased. For example, the edge weight may be the actual count of co-purchases of the two respective categories. In some embodiments, the edge weight may be an logarithm of the actual count, a linear function of the count, or other functions thereof. In some embodiments, nodes 402 may be removed from the graph that do not meet have a threshold number of edges 404 connected thereto, and edges 404 may be removed from the graph that do not meet a threshold weight. Alternatively, such insignificant data points may be scrubbed prior to constructing the graph. This way, the graph is reduced to only the most significant data, and thus the amount of data, memory and computational resources required is also further reduced.

Figure 5:
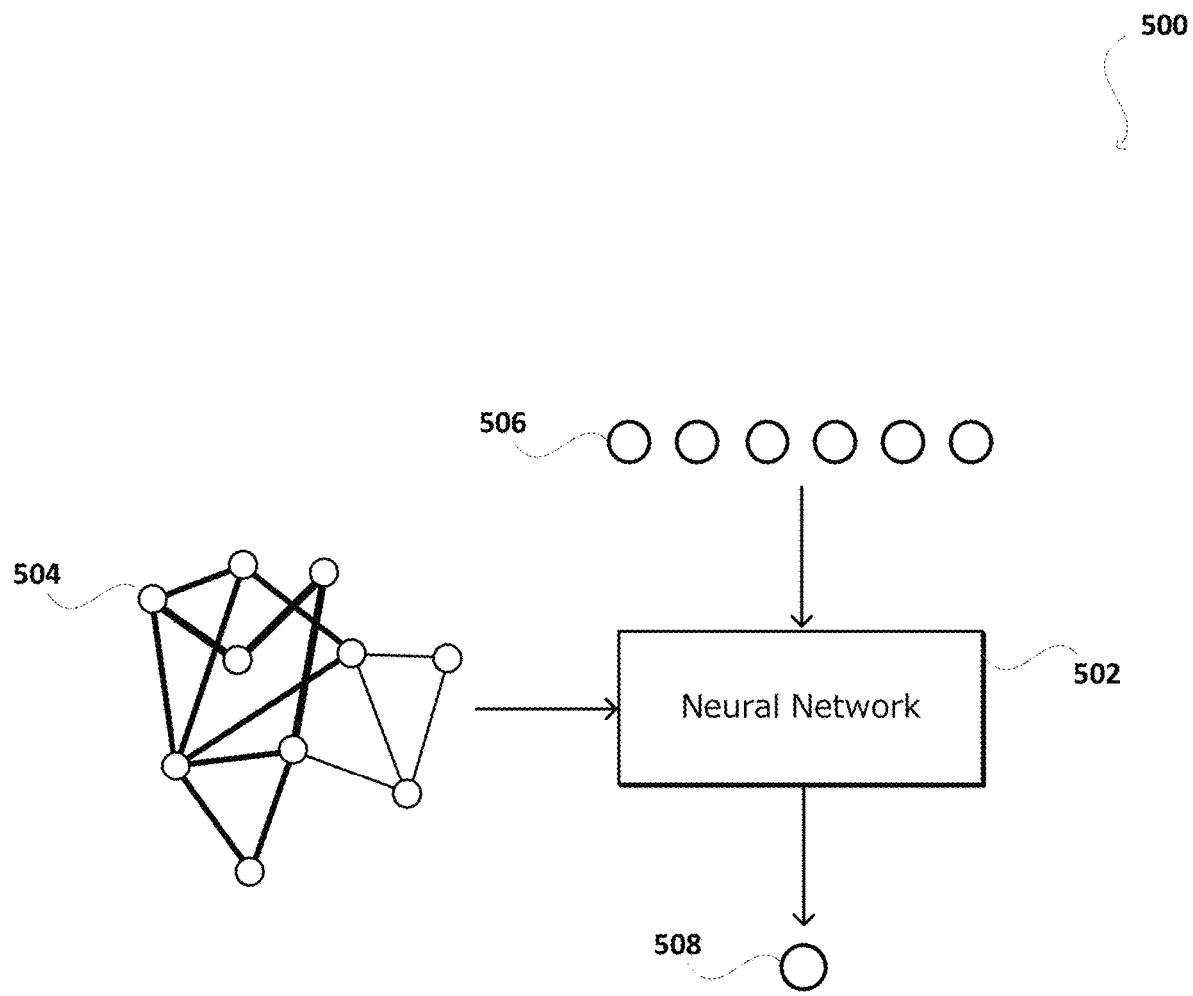
FIG. 5 illustrates a diagram of a machine learning model for determining a new category to recommend to a user, in accordance with various embodiments of the present disclosure.

FIG. 5 illustrates a diagram of a machine learning model 500 for determining a new category to recommend to a user, in accordance with various embodiments. In accordance with various embodiments of the present disclosure, in order to be able to predict new categories a user may be interested in, a machine learning model, such as one including a deep neural network, may be trained using both the previous purchase data from the particular user as well as the previous purchase data from many other users to infer what new category of items the particular user might be interested in. Specifically, in some embodiments, a neural network 502 may the trained using a graph 504 constructed form the purchase data of a plurality of users. Then for a target user, the previous categories 506 that the user has purchased from is used as input into the neural network, and the neural network outputs a new category 508 that the user may be interested in that they have not yet purchased from. Essentially, the machine learning model looks for other users with similar purchasing behavior as the particular user and determines what other categories those other users have purchased in that the particular user has not purchased in, as this may be a robust way to predict new categories that the particular user is likely to be interested in. The model looks for other users who made purchases in the categories that the target user makes purchases in, and finds additional categories that those similar users made purchases in that the target user has not made any purchases in. These are the categories that the target user may also be interested in but has not discovered yet, and thus should be recommended to the target user. Such techniques allows for both generalization across users as well as personalization of the recommended new category or items that are presented to individual users.

A model comprising a deep neural network may then be trained using the graph to determine a new category from the plurality of categories that a user is predicted to be interested in but has not previously purchased from based on one or more previous categories that the user has purchased from. After training, the model may be used to make recommendation for a target user. Specifically, in order to obtain a new category recommendation for a target user, one or more previous categories that the target user has purchased items from can be determined and used as input into the model. The one or more previous categories may be processed through the trained model, and the model then produces an output including at least one new category that the target user is predicted to be interested in but has not previously made purchases from. In some embodiments, one or more items belonging to the new category may be recommended to the target user.

As mentioned, the model may be training using the graph or trained directly using the historical interaction data of a plurality of users. In some embodiments, the model may be trained using both a graph and some plain historical interaction data. For example, a portion of the historical interaction data may be used to construct the graph and a portion is inputted into the model directly. In some embodiments, multiple graphs and/or multiple types of interaction data can be used to train the model. For example, the model can be trained using a first graph representing historical purchase data and a second graph representing historical browsing data, among other types of historical data. In some embodiments, one graph may include different types of interaction data. For example, such a graph may include edges that represent categories that are purchased together as well as edges that represent categories that are browsed together. One or more of these graphs can also be used together with other forms of data to train the model. The model may be trained using historical data represented in various forms (e.g., graphs, raw data, and processed data) and as well of different types of data or indicators of interest (e.g., purchase data, browsing data, session data).

Various types of machine learning models may be used with the techniques described herein. Neural networks is one example. Various types of activation functions may be used, such as but not limited to a rectified linear unit (ReLU) model with a nonlinear activation. In some embodiments, neural network model may be linear or nonlinear, and may include a deep learning model or a single hidden layer. Other types of machine learning models may be used, such as decision tree models, associated rule models, neural networks including deep neural networks, inductive learning models, support vector machines, clustering models, regression models, Bayesian networks, genetic models, various other supervise or unsupervised machine learning techniques, among others. The model may include various other types of models, including various deterministic, nondeterministic, and probabilistic models.

For example, convolutional neural networks are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. convolutional neural networks exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer along with a lower layer and an output layer make up the fully connected portion of the network. From the input layer, a number of output values can be determined from the output layer.

Figure 6:
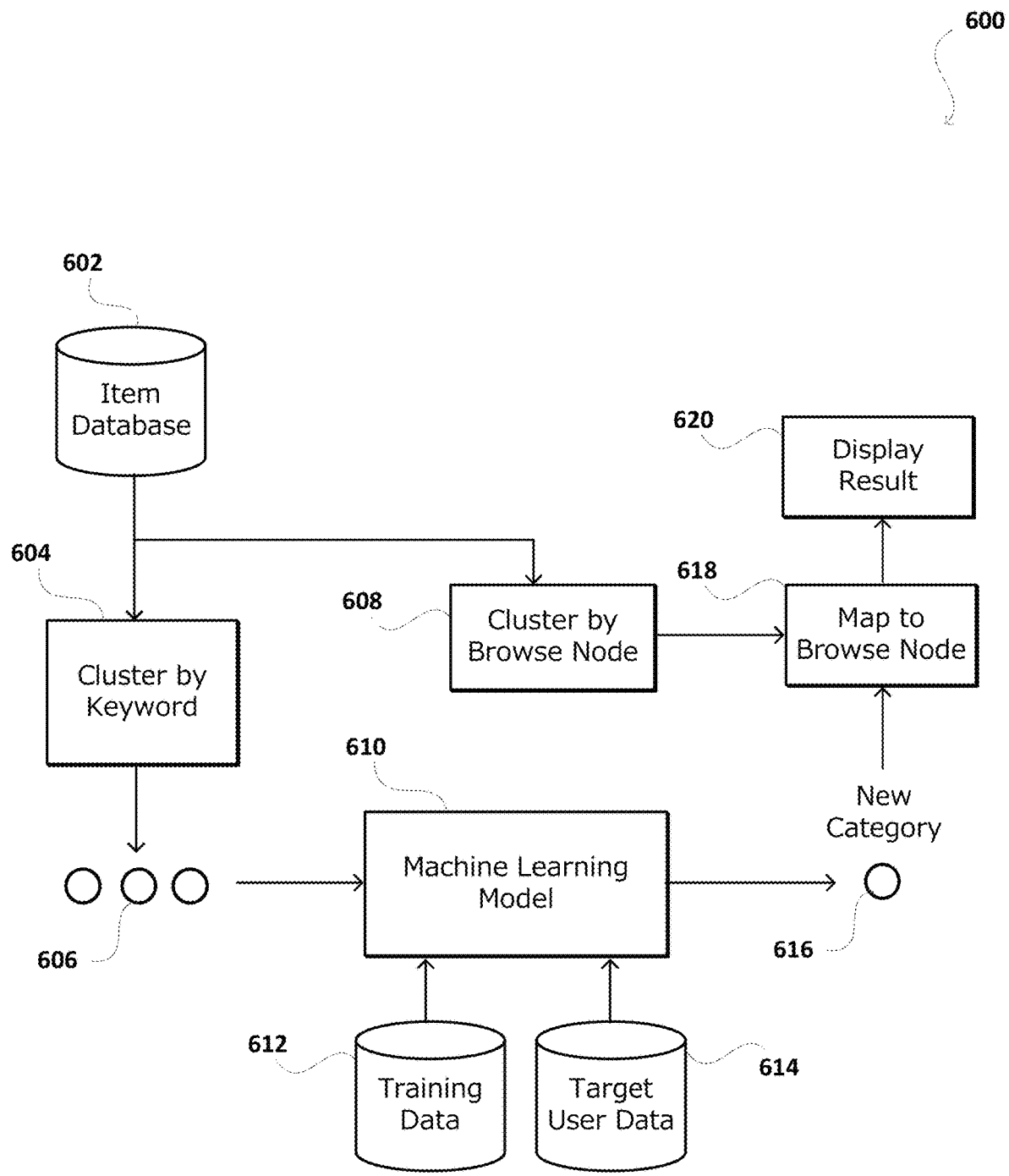
FIG. 6 illustrates a diagram of a system for determining a new category to recommend to a user, in accordance with various embodiments of the present disclosure.

FIG. 6 illustrates a diagram 600 of a system for determining a new category to recommend to a user, in accordance with various embodiments. The electronic marketplace or other platform has a catalog of items available, which makes up the database of items 602 available that are used with the model, such as for training and/or for recommending to users through the model. The database of items 602 may be periodically updated, so as not to have stale item in there, such as those that are no longer available or relevant. The recommendations will be selected from the database of items 602. In various embodiments, the items may be clustered 604 into a plurality of clusters 606 based on the item type keywords associated with each item. In an example embodiment, the items are first partitioned by their product type label, which may or may not correspond to browse node. Examples product types may be the broad categories of "Shoes", "Socks", and "Shirts", which are distinguished from each other. Taking the product label "Shoes" as example, the items may be further clusters based on item type keyword, that can distinguish between Running Shoes and Ballet Sandals, for example. As the clusters are formed based on the item universe, it may be updated at the same frequency as the item universe.

In some embodiments, the same database of items 602 is used to obtain browse node clustering, in which the items are clustered 608 based on their respective browser node, which may be a more familiar classification to users as it is generally the predominate form of user-facing item classification, or how users generally browse the catalog of items. In various embodiments, the item type keyword clusters are used for the model and used to make the new category recommendation, and the browser nodes are used to display the recommendation result to the user, as described in further detail below.

A key challenge in developing the present system is defining the notion of a category, from which to make recommendations. One criteria is that the categories are not too high level, such that the items within a category are not too diverse. If the items within a category are too diverse, the actual products within a chosen new category may be too unpredictable and thus there is low confidence that recommending a product from the category will actually be relevant to the user. If the categories are too broad, the relationship between the categories and thus, the recommendation may be difficult to explain. For example, It might be difficult to explain why a customer who bought books (broad category) was being recommended groceries (broad category), but it is significantly easier to reason why a customer who bought vegan cookbooks (fine-grained category) is being recommended vegetables (fine-grained category).

Another criteria is that the categories are not too specific, as that might make the data too sparse, and make it difficult to learn relationships between categories. Similarly, the categories should not be too specific as the method should be scalable. Hence, the categories cannot be too fine-grained. Additionally, categories that are too fine grained might bias the models to sacrifice diverse catalog exploration, and not significantly enhance customer experience. For example, if the categories are too fine-grained, the recommendations may result in being too similar to products the user already browses or purchases, thereby failing to truly recommend new categories. In other words, the categories should be defined such that the signal to noise ratio in the data is appropriate, and a model of sufficient complexity is able to generalize the dataset well.

Defining the plurality of categories may be determined based at least in part on at least one of the number of items in the catalog, the type of items in the catalog, the variety of items in the catalog, the historical purchase data, browse nodes of the online platform, keywords in the descriptions of the items in the catalog, among other techniques or classification algorithm. In some embodiments, the item universe may be automatically classified into a plurality of categories based on one or more of the above parameters to determine the optimal classification of the items.

Referring still to FIG. 6, a machine learning model 610, which may include a neural network, may be trained at certain time intervals, such as every year, month, few days, or even once a day. The model 610 may takes as input the pre-defined clusters 606, as well as training data 612, which includes sample user interaction data (e.g., purchase behavior) of a plurality of previous users used to train the model 610 to make new category recommendation for a given target user. Thus given a target user, the model further takes as input, the historical interaction data of the target user 614 and recommends the next new cluster (i.e., category) 616 the target user is likely to purchase from, based on the sample user interaction data. In some embodiments, the model 610 may be a feedforward model and perform multiclass classification to determine the next new category for the target user. In some embodiments, modeling techniques using a graph-based regularizer and a low rank factorization of the parameters may be used. Furthermore, there may be an added benefit of yielding category-specific embeddings that can be used in downstream tasks. A graph-based regularization framework may be employed for encouraging representations of categories that are co-purchased to be closer to each other, which may improve performance in some models.

An item from the catalog of items belonging to the new category may be determined for recommending to the target user. The item selected for recommending to the target user may be determined based on various item selection/recommendation techniques. For example, the item may be selected based on a popularity ranking of items with respect to the new category. In some embodiments, a plurality of items from the new category may be presented to the target user. This plurality of items may be relatively similar to or diverse from each other. A simple popularity based ranking may be used in some embodiments and/or for some categories, while other techniques such as brand-specific rankings might be more relevant in others. In some embodiments, the technique for selecting specific products to select from the recommended new category may be based on what the category is.

For displaying the recommendation to the user, the items in the selected cluster may be mapped 618 to their respective browse nodes, and then displayed 620 to the user, such as in a designated or fluid portion of the user interface for the platform. As described, browse nodes are typically used for general website display because it is what users are accustomed to. Browse nodes are used in displaying refinement controls, category pages, etc., and are a common merchandising entity. However, for processing through the machine learning model and making a robust recommendation, using item type keywords or another more fine-grained classification provides for a more robust categorization. Thus, the items selected from the recommended new category based on item type keyword clustering are then mapped to their respective browse node classification for presenting to the user.

In some embodiments, rather than selecting a specific item to recommend, it is truly the category that is being recommended. For example, the recommendation may be a link directing the user to the category page. In some embodiments, the category page may be a generic category page with items being listed in a generic format. In some other embodiments, the category page may include selected and/or ranked list of specific items that may be of interest to the user. Another alternative is to rank the browse nodes or recommended categories, and show a ranked list of browse nodes to the customer. Clicking on a single item will then take the customer to a landing page corresponding to that browse node.

Figure 7:
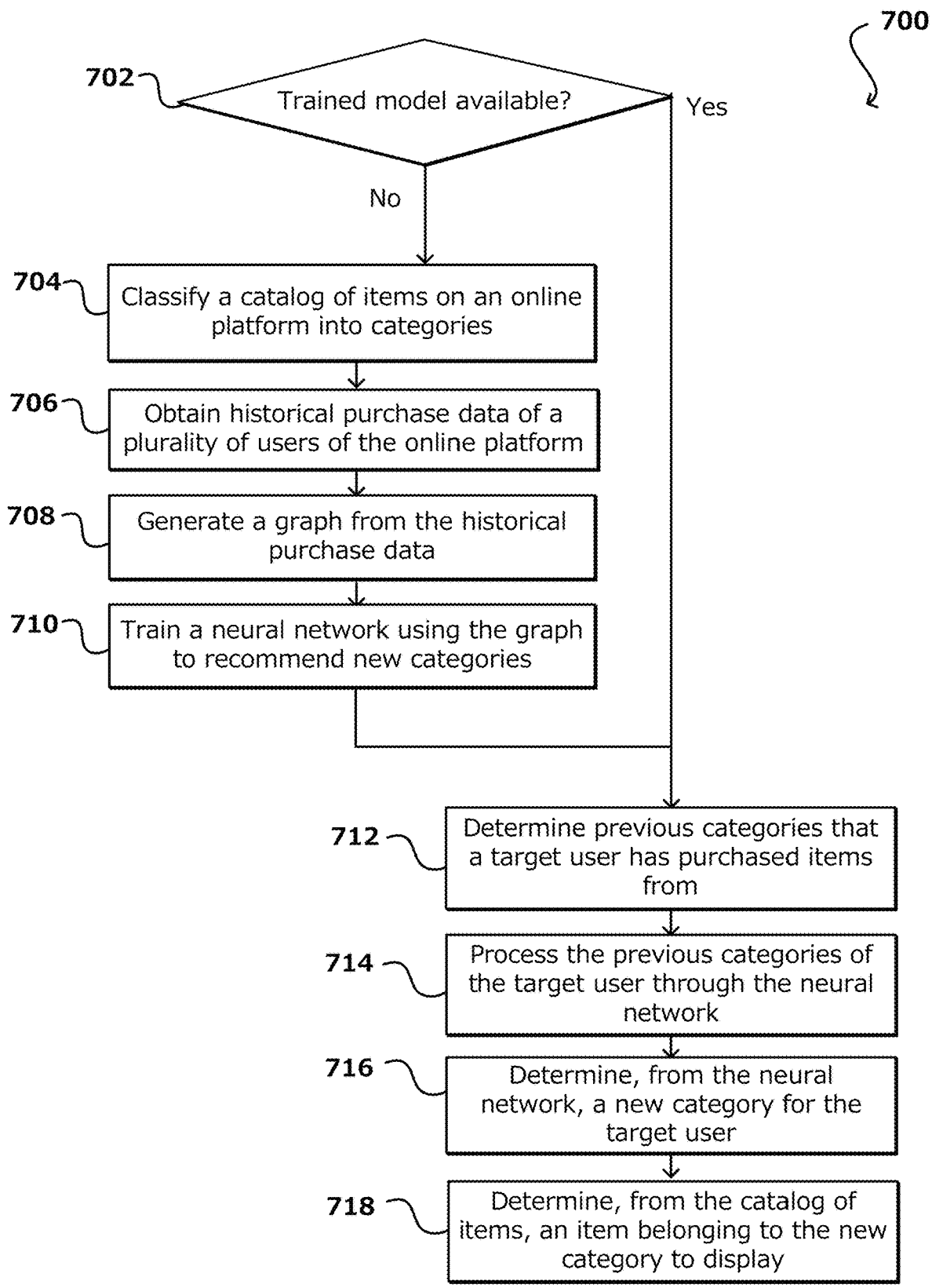
FIG. 7 illustrates a process for determining a new category to recommend to a user based on a graph and machine learning, in accordance with various embodiments of the present disclosure.

FIG. 7 illustrates a process 700 for determining a new category to recommend to a user based on a graph and machine learning, in accordance with various embodiments. It should be understood that, for any process discussed herein, there can be additional, fewer, or alternative steps performed in similar or alternative orders, or in parallel, within the scope of the various embodiments. In this example, it is determined 702 whether a trained model exists. If a trained model does not exist, then training steps are performed. For example, a catalog of items offered on an online platform are classified 704 into a plurality of categories. In some embodiments, the plurality of categories into which the catalog of items are classified are defined based at least in part on at least one of the number of items in the catalog, the type of items in the catalog, the variety of items in the catalog, the historical purchase data, browse nodes of the online platform, or keywords in the descriptions of the items in the catalog. Historical purchase data of a plurality of users of the online platform may be obtained 706. The historical purchase data may include items from the catalog purchased by each user and/or the respective categories of the items. In some embodiments, instead of or in addition to using purchase data, product browsing data, or other forms of interaction data, may be used.

A graph may be generated 708 from the historical purchase data. The graph may include a plurality of nodes and a plurality of edges, in which the plurality of nodes represents the plurality of categories and an edge connecting two nodes representing at least one instance in which a user of the plurality of users purchased items from both categories represented by the two nodes, or a "co-purchase". In some embodiments, the edges may have respective weights corresponding to the number of instances of the respect co-purchase. Thus, the graph can represent the complete information of the historical purchase data with less data. In some embodiments, nodes may be removed from the graph that do not meet have a threshold number of edges connected thereto, and edges may be removed from the graph that do not meet a threshold weight. This way, the graph is reduced to only the most significant data, and thus the amount of data, memory and computational resources required is also further reduced. A neural network may be trained 710 using the graph. The neural network may be trained to determine a new category from the plurality of categories that a user is predicted to be interested in but has not previously purchased from based on one or more previous categories that the user has purchased from. In some other embodiments, the neural network may be trained using the raw historical purchase data.

After training, or if a model has already been trained, the model may be used to make recommendation for a target user. Specifically, in order to obtain a new category recommendation for a target user, one or more previous categories that the target user has purchased items from can be determined 712 and used as input into the model. The one or more previous categories may be processed 714 through the trained model. The model then determines 716, as an output, at least one new category that the target user is predicted to be interested in but has not previously made purchases from. In some embodiments, the new category determine by the neural network for the target user represents the next category that the target user is predicted to make a purchase from that the target user has not made a purchase in before. In some embodiments, one or more items belonging to the new category may be recommended 718 to the target user.

Figure 8:
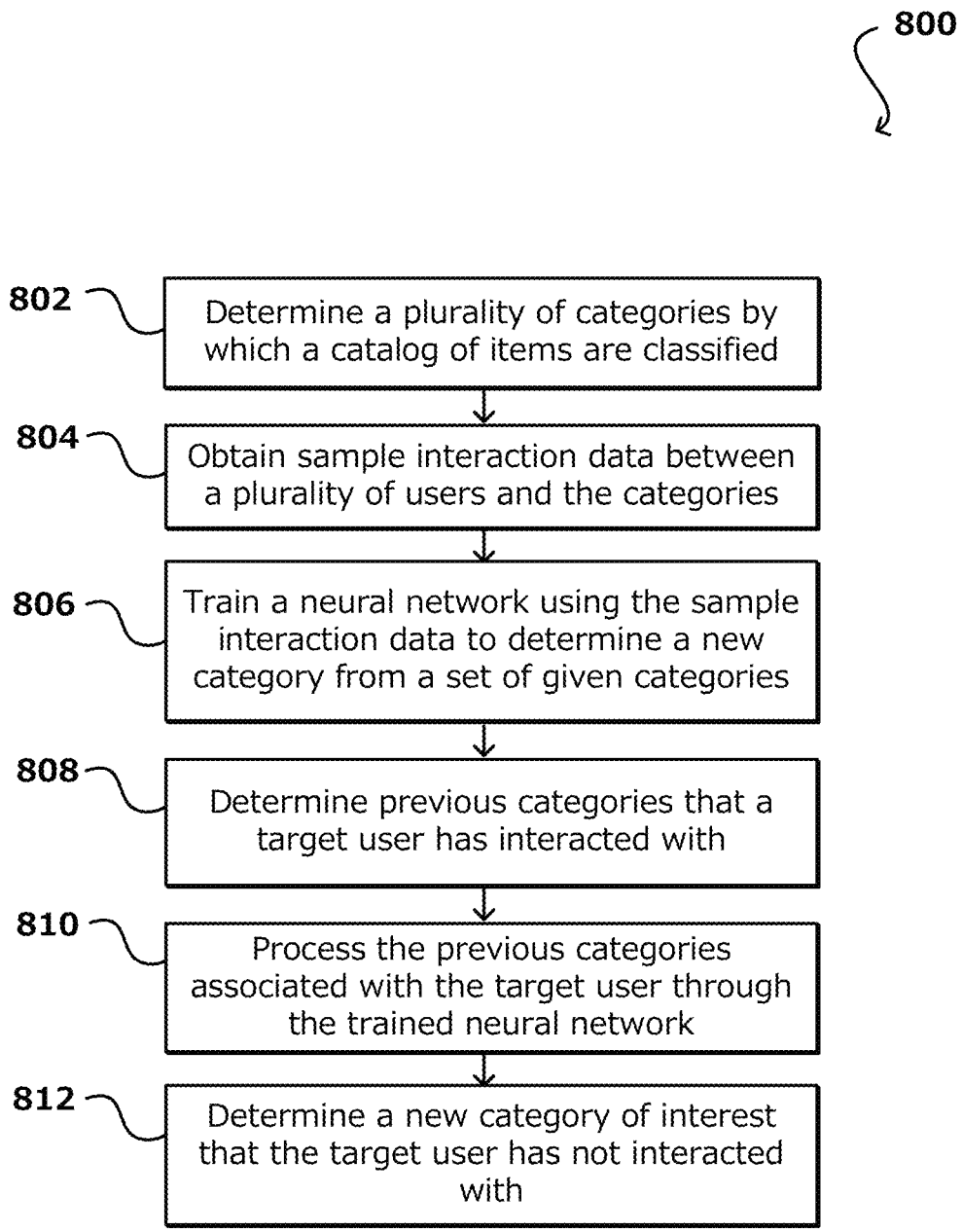
FIG. 8 illustrates a process for determining a new category to recommend to a user based on machine learning, in accordance with various embodiments of the present disclosure.

FIG. 8 illustrates a process 800 for determining a new category to recommend to a user based on machine learning, in accordance with various embodiments. In this example, a plurality of categories by which a catalog of items of an electronic platform are classified is determined 802. In various embodiments, the catalog of items may include physical products, digital content, or both. In some embodiments, the plurality of categories may correspond to a plurality of browse nodes by which the catalog of items is organized and presented on a user interface. The catalog of items may also be classified into the plurality of categories based on keywords associated with the items.

Sample interaction data of a plurality of past or current users of the platform is obtained 804. The sample interaction data for each user of the plurality of past or current users includes a set of categories from the plurality of categories with which the user has interacted. Interaction with a category may vary depending on the embodiment or type of electronic platform. For example, interaction may refer to purchasing a product and/or viewing or clicking on the product. In some embodiments, the sample interaction data for each user may be associated with a predetermined time period or a predetermined number of most recent categories with which each user has interacted.

A neural network may be trained 806 using the sample interaction data or a representation of the sample interaction data to determine an output category from the plurality of categories based on a set of given categories. The output category is distinct from the given categories, such that it is a new category that the given user has not yet interacted with. In various embodiments, as described above, a graph representing the sample interaction data may be constructed and used to train the neural network instead of using the raw sample interaction data.

After training, the model may be used to make recommendation for a target user. Thus, for a target user, one or more previous categories that the target user has interacted with may be determined 808 or obtained. In some embodiments, the one or more previous categories includes a predetermined number of the most recent categories with which the target user has interacted or all the categories that the target user interacted with over the course of a predetermined amount of time. Thus, the most recent data is being used, which may produce more relevant results.

The one or more previous categories that the target user has interacted with may be processed 810 through the trained neural network. A new category that the target user has not interacted with may be determined 812 from the trained neural network based at least in part on the one or more previous categories that the target user has interacted with. In some embodiments, the new category determine by the neural network for the target user represents the next category that the target user is predicted to interact with which the target user has not interacted with before.

In some embodiments, an item from the catalog of items belonging to the new category may be determined for recommending to the target user. The item selected for recommending to the target user may be determined based on various item selection/recommendation techniques. For example, the item may be selected based on a popularity ranking of items with respect to the new category. In some embodiments, a plurality of items from the new category may be presented to the target user. This plurality of items may be relatively similar to or diverse from each other.

Figure 9:
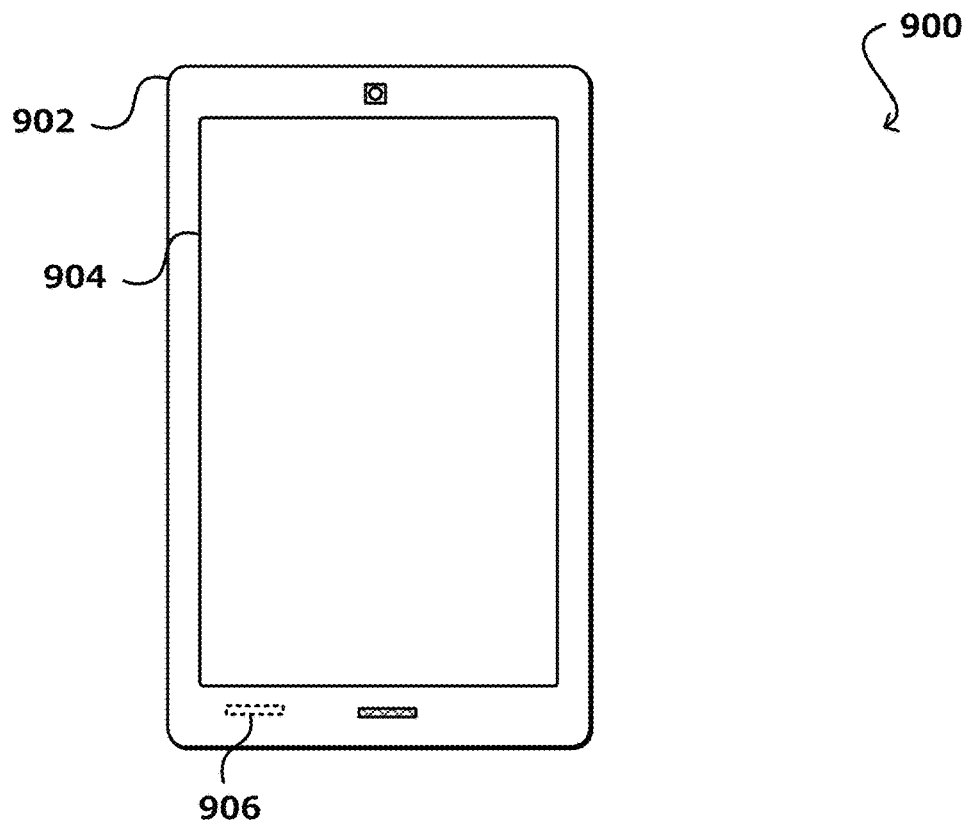
FIG. 9 illustrates an example computing device that can be used, in accordance with various embodiments of the present disclosure.

FIG. 9 illustrates an example computing device that can be used, in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, the computing device 900 has a display screen 904 and an outer casing 902. The display screen under normal operation will display information to a user (or viewer) facing the display screen (e.g., on the same side of the computing device as the display screen). As discussed herein, the device can include one or more communication components 906, such as may include a cellular communications subsystem, Wi-Fi communications subsystem, BLUETOOTH® communication subsystem, and the like.

Figure 10:
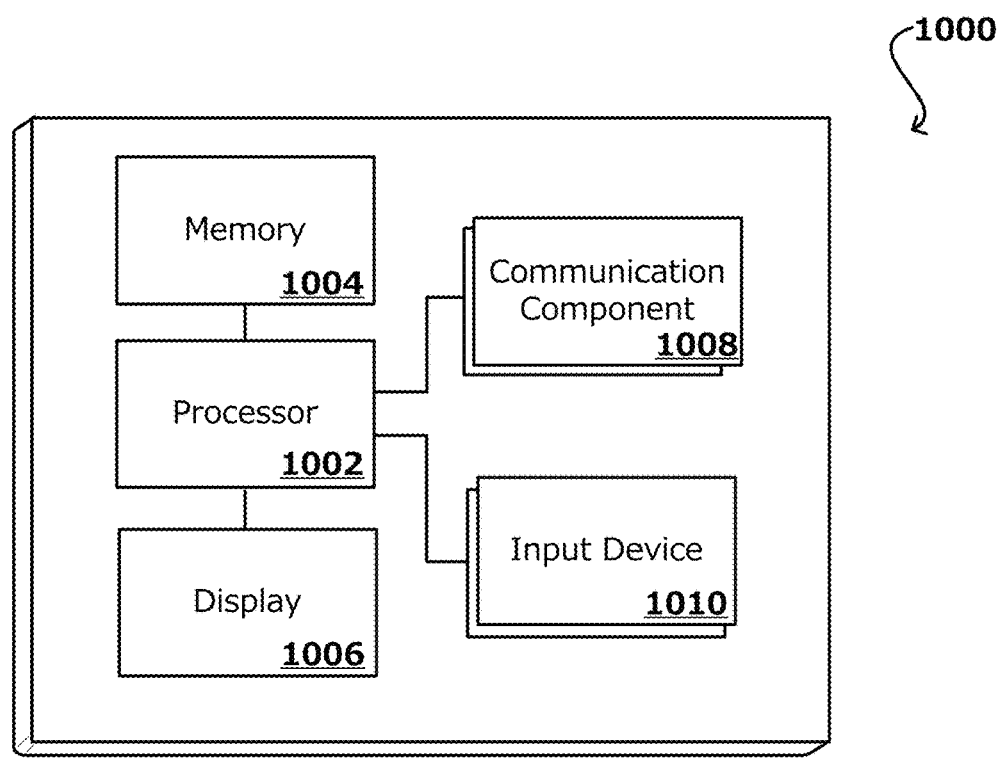
FIG. 10 illustrates a set of basic components of one or more devices, in accordance with various embodiments of the present disclosure.

FIG. 10 illustrates a set of basic components 1000 of one or more devices, in accordance with various embodiments. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. The device typically will include at least one type of display element 1006, such as a touch screen, electronic ink (e-ink), organic light emitting diode (OLED) or liquid crystal display (LCD), although devices such as portable media players might convey information via other means, such as through audio speakers.

The device can include at least one communication component 1008, as may enabled wired and/or wireless communication of voice and/or data signals, for example, over a network such as the Internet, a cellular network, a Wi-Fi network, BLUETOOTH®, and the like. The device can include at least one additional input device 1010 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 11:
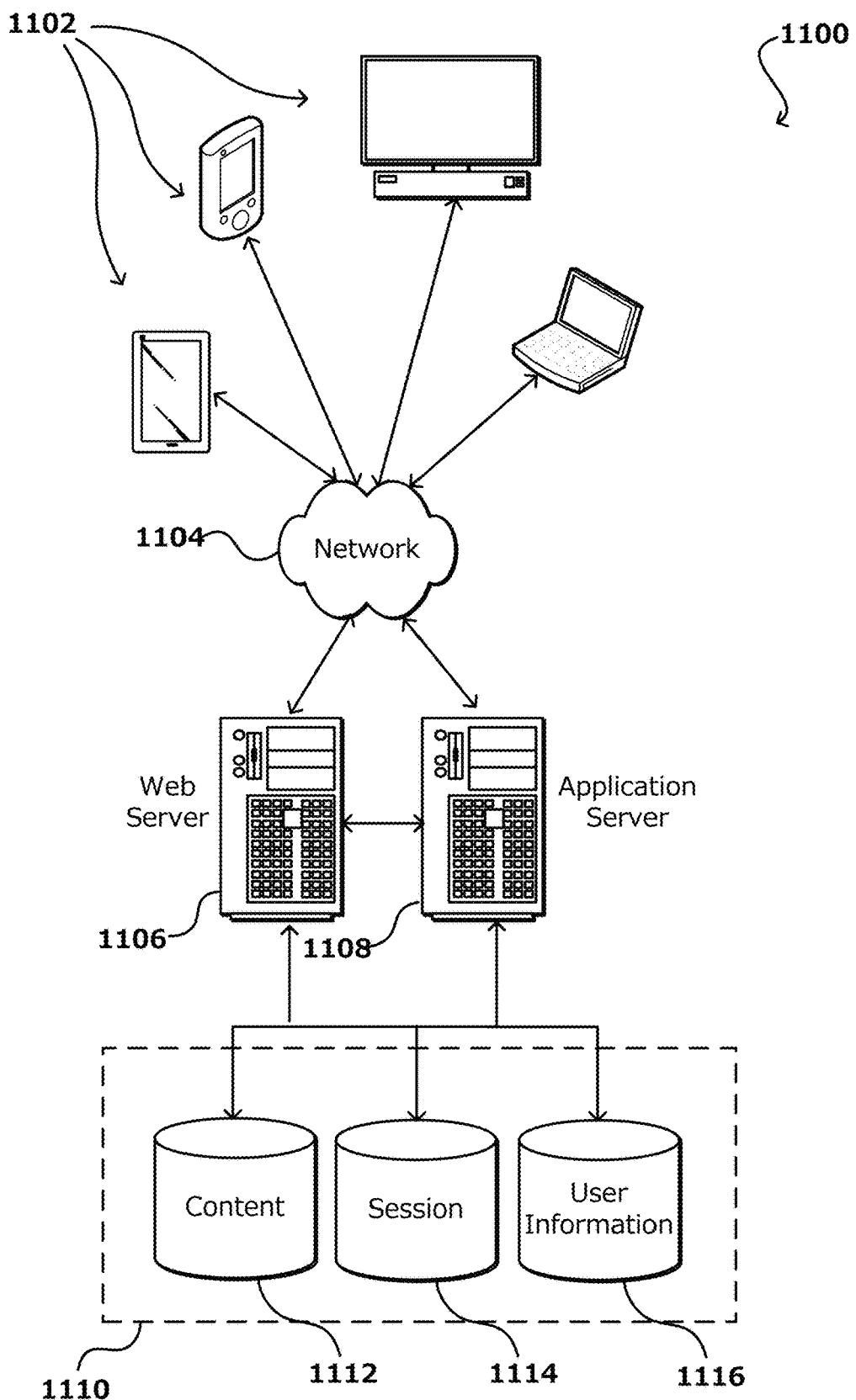
FIG. 11 illustrates an example environment for implementing aspects, in accordance with various embodiments of the present disclosure.

FIG. 11 illustrates an example environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above.

The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a plurality of categories by which a catalog of items are classified;
   obtaining sample interaction data of a plurality of sample users, the sample interaction data for each sample user including a list of categories from the plurality of categories with which the sample user has interacted;
   training a neural network using the sample interaction data to predict a new category of interest to a target user from the plurality of categories based at least in part on a list of one or more categories with which the target user has interacted, wherein the new category of interest is not in the list of one or more categories;
   determining, for the target user, the list of one or more categories with which the target user has interacted;
   processing the list of one or more categories associated with the target user through the trained neural network;
   determining, from the trained neural network, the new category of interest with which the target user has not interacted, but which is predicted to be of interest to the target user, based at least in part on the list of one or more categories with which the target user has interacted; and
   determining, from the catalog of items, an item belonging to the new category of interest for recommending to the target user.

2. The method of claim 1, wherein the catalog of items includes physical products, digital content, or both.

3. The method of claim 1, wherein the plurality of categories correspond to a plurality of browse nodes by which the catalog of items is organized and presented on a user interface.

4. The method of claim 1, wherein the catalog of items are classified into the plurality of categories based on keywords associated with the items.

5. The method of claim 1, wherein the sample interaction data for each user is associated with a predetermined time period or a predetermined number of most recent categories with which each user has interacted.

6. The method of claim 1, wherein interaction with a category includes at least one of purchasing an item from the category or viewing an item from the category.

7. The method of claim 1, further comprising:
   generating a graph representing the sample interaction data, the graph comprising a plurality of nodes and a plurality of edges, the plurality of nodes representing the plurality of categories and an edge connecting two nodes representing at least one instance in which a user of the plurality of sample users interacted with items from both categories represented by the two nodes; and
   training the neural network using the graph.

8. The method of claim 7, wherein the edge connecting the two nodes is associated with a weighting factor determined based on a number of instances in which the user of the plurality of sample users purchased items from both categories represented by the two nodes.

9. The method of claim 1, wherein the list of one or more categories with which the target user has interacted includes a predetermined number of most recent categories with which the target user has interacted or all categories that the target user interacted with over a predetermined amount of time.

10. The method of claim 1, wherein the new category determined by the neural network for the target user represents a next category that the target user is predicted to interact with which the target user has not interacted with before.

11. The method of claim 1, wherein the item selected for recommending to the target user is determined based at least in part on a popularity ranking of items in the new category.

12. A system, comprising:

at least one computing device processor; and a memory device including instructions that, when executed by the at least one computing device processor, cause the system to:

determine a plurality of categories by which a catalog of items are classified;

obtain sample interaction data of a plurality of sample users, the sample interaction data for each sample user including a list of categories from the plurality of categories with which the sample user has interacted;

train a neural network using the sample interaction data to predict a new category of interest to a target user from the plurality of categories based at least in part on a list of one or more categories with which the target user has interacted, wherein the new category of interest is not in the list of one or more categories;

determine, for the target user, the list of one or more categories with which the target user has interacted;

process the list of one or more categories associated with the target user through the trained neural network;

determine, from the trained neural network, the new category of interest with which the target user has not interacted, but which is predicted to be of interest to the target user, based at least in part on the list of one or more categories with which the target user has interacted; and determine, from the catalog of items, an item belonging to the new category of interest for recommending to the target user.

13. The system of claim 12, wherein interaction with a category includes at least one of purchasing an item from the category or viewing an item from the category.

14. The system of claim 12, wherein the instructions when executed further cause the system to:

generate a graph representing the sample interaction data, the graph comprising a plurality of nodes and a plurality of edges, the plurality of nodes representing the plurality of categories and an edge connecting two nodes representing at least one instance in which a user of the plurality of sample users interacted with item from both categories represented by the two nodes; and train the neural network using the graph.

15. The system of claim 14, wherein the edge connecting the two nodes is associated with a weighting factor determined based on a number of instances in which the user of the plurality of sample users purchased items from both categories represented by the two nodes.

16. The system of claim 12, wherein the instructions when executed further cause the system to: define the plurality of categories into which to classify the catalog of items based at least in part on at least one of a number of items in the catalog, a type of items in the catalog, a variety of items in the catalog, the sample interaction data, browse nodes of an online platform, or keywords in descriptions of the items in the catalog.

* * * * *